United States Patent
Khoshniat et al.

(10) Patent No.: US 12,341,569 B1
(45) Date of Patent: Jun. 24, 2025

(54) WIRELINE LINK WITH CROSSTALK REDUCTION BASED ON CONTROLLED CHANNEL DELAY

(71) Applicant: Eliyan Corporation, Santa Clara, CA (US)

(72) Inventors: Ali Khoshniat, San Jose, CA (US); Ramin Farjadrad, Los Altos, CA (US)

(73) Assignee: Rambus Inc., San Jose, CA (US)

( * ) Notice: Subject to any disclaimer, the term of this patent is extended or adjusted under 35 U.S.C. 154(b) by 11 days.

(21) Appl. No.: 18/399,067

(22) Filed: Dec. 28, 2023

Related U.S. Application Data

(60) Provisional application No. 63/436,761, filed on Jan. 3, 2023.

(51) Int. Cl.
*H04B 3/32* (2006.01)
(52) U.S. Cl.
CPC ..................... *H04B 3/32* (2013.01)
(58) Field of Classification Search
CPC ....................................................... H04B 3/32
See application file for complete search history.

(56) References Cited

U.S. PATENT DOCUMENTS

| | | | |
|---|---|---|---|
| 7,346,119 B2 * | 3/2008 | Gorecki | H04L 25/4919 370/533 |
| 9,118,566 B1 * | 8/2015 | Mendel | H04L 43/106 |
| 11,088,876 B1 * | 8/2021 | Farjadrad | H04L 25/0298 |
| 2002/0071547 A1 * | 6/2002 | Bershad | H04B 3/23 379/406.01 |
| 2025/0103360 A1 * | 3/2025 | Pallapothu | G06F 9/455 |

* cited by examiner

*Primary Examiner* — Janice N Tieu
(74) *Attorney, Agent, or Firm* — Lance Kreisman; Peninsula Patent Group

(57) ABSTRACT

Semiconductor devices, packaging architectures and associated methods are disclosed. In one embodiment, a wireline signaling link is disclosed. The wireline signaling link includes a first transceiver circuit disposed on a first integrated circuit (IC) chip. The first transceiver circuit includes first transmit circuitry to transmit a first set of symbols representing first data, each symbol having a symbol time. The first transceiver circuit also includes first receiver circuitry to receive a second set of symbols representing second data. A second transceiver circuit is disposed on a second IC chip. The wireline signaling link includes a bidirectional channel having a first end coupled to the first transceiver circuit and a second end coupled to the second transceiver circuit. The wireline signaling link further includes circuitry to make an adjustment of an electrical delay of the wireline signaling link, the adjustment based on a phase relationship between interference associated with the first data that is received by the first receiver circuitry and the second data that is received by the first receiver circuitry.

19 Claims, 5 Drawing Sheets

WIRELINE LINK WITH CROSSTALK REDUCTION BASED ON CONTROLLED CHANNEL DELAY

CROSS-REFERENCE TO RELATED APPLICATIONS

This application is a Non-Provisional that claims priority to U.S. Provisional Application No. 63/436,761, filed Jan. 3, 2023, entitled DELAY CONTROL TO MINIMIZE NEXT AND ECHO IMPAIRMENTS IN WIRELINE LINKS, which is incorporated herein by reference in its entirety.

TECHNICAL FIELD

The disclosure herein relates to semiconductor devices, packaging and associated methods.

BACKGROUND

Wireline links are found in many forms of package substrates and board assemblies. The links often interconnect two semiconductor integrated circuit (IC) chips that are disposed on the substrates or boards. In some instances, many wireline links may be used for densely routed die-to-die interfaces such that the wireline links may generate near end crosstalk (NEXT) and/or echo interference in the form of reflections. The presence of crosstalk can impact signal integrity for high-speed parallel signaling paths.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Semiconductor devices, packaging architectures and associated methods are disclosed. In one embodiment, a wireline signaling link is disclosed. The wireline signaling link includes a first transceiver circuit disposed on a first integrated circuit (IC) chip. The first transceiver circuit includes first transmit circuitry to transmit a first set of symbols representing first data, each symbol having a symbol time. The first transceiver circuit also includes first receiver circuitry to receive a second set of symbols representing second data. A second transceiver circuit is disposed on a second IC chip. The wireline signaling link includes a bidirectional channel having a first end coupled to the first transceiver circuit and a second end coupled to the second transceiver circuit. The wireline signaling link further includes circuitry to make an adjustment of an electrical delay of the wireline signaling link, the adjustment based on a phase relationship between interference associated with the first data that is received by the first receiver circuitry and the second data that is received by the first receiver circuitry. By employing the adjustment circuitry, NEXT and/or echo interference may be compensated-for in a straightforward and cost-effective manner.

Figure 1:
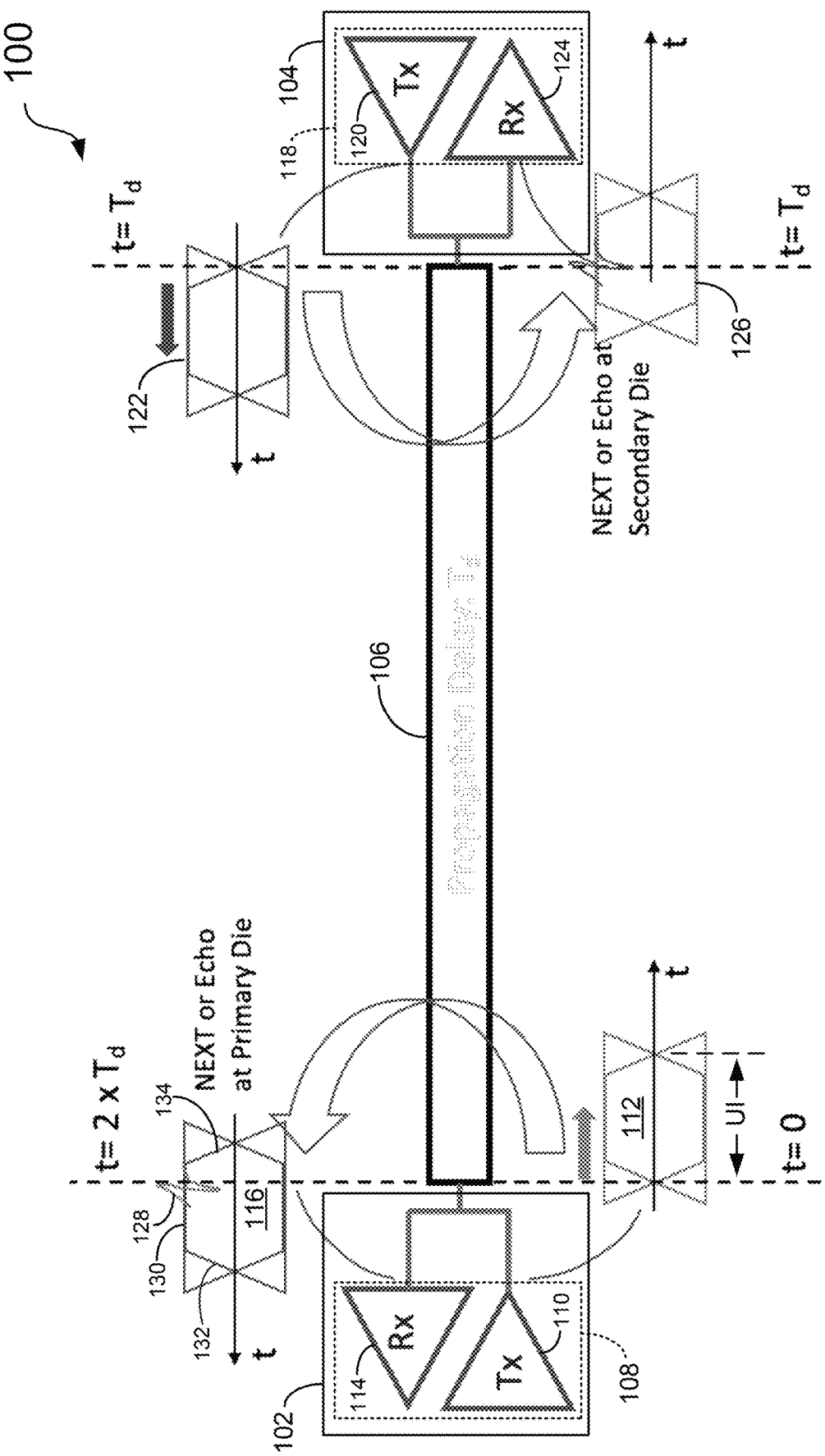
FIG. 1 illustrates a chip-to-chip coupling including a first integrated circuit (IC) chip in communication with a second IC chip via a bidirectional wireline link without crosstalk compensation.

FIG. 1 illustrates a primary integrated circuit (IC) chip 102 coupled to a secondary IC chip 104 via a bidirectional wireline link 106. The primary IC chip 102 includes a first transceiver 108. The first transceiver 108 includes a first transmitter 110 that couples to one end of the bidirectional wireline link 106 and transmits first data in the form of a first set of symbols, one of which is shown at 112. The first transceiver 108 includes a first receiver 114 that receives second data in the form of a second set of symbols, one of which is shown at 116. For one embodiment, the first transceiver 108 is a simultaneous bidirectional transceiver where the first transmitter 110 and the first receiver 114 simultaneously transmit and receive the first and second data over the same bidirectional wireline link 106 during respective transmit and receive timing intervals that at least partially overlap in time.

Further referring to FIG. 1, the second IC chip 104 includes a second transceiver 118 that includes a second transmitter 120 that couples to the other end of the bidirectional wireline link 106 and transmits the second set of symbols, one of which is shown at 122. The second transceiver 118 includes a second receiver 124 that receives the first set of symbols via the bidirectional link 106 following a propagation delay Td that is associated with the link 106. An example of one of the first set of symbols received at the receive side of the link 106 is shown at 126. For one embodiment, the second transceiver 118 is also a simultaneous bidirectional transceiver for communicating with the first transceiver 108 in a simultaneous bidirectional manner.

With continued reference to FIG. 1, for one embodiment, the bidirectional wireline link 106 comprises a single conductor in a single-ended channel configuration, such as a wire or trace that forms an electrical channel having a physical length and an electrical length. Based on its physical and electrical characteristics, the channel exhibits the propagation delay Ta for signals traversing the channel from one end to the other. For some embodiments, the bidirectional wireline link 106 is formed in a package substrate (not shown) that may be employed in a multi-chip module (MCM) context, with the first and second IC chips 102 and 104 taking the form of chiplets that communicate with each other over the link 106.

For one embodiment, the timing associated with the various transmitters 110, 120 and receivers 114, 124 may be synchronized to a centralized clock source (not shown), and may generally involve configuring a given local receiver, such as at 114, to have a quadrature sampling offset with respect to its associated local transmitter, such as at 110. In response to each edge of the centralized clock source, such as at time t=0, a given first symbol of information may be transmitted by the local transmitter, such as the first data 112 by transmitter 110, and a second symbol sampled by the receiver 114, with each symbol being of a defined unit interval (UI) width.

In operation, and further referring to FIG. 1, as a given symbol 112 of the first set of symbols is transmitted from the first transmitter 110 at time t=0, multiple forms of crosstalk interference may arise at the first receiver 114. One form of interference may comprise near-end crosstalk (NEXT), which is caused by a mutual coupling between the first transmitter 110 and the first receiver 114. The NEXT interference is generally seen at the first receiver 114 as the first transmitter 110 drives its symbols. Another form of interference may involve echo that is formed by reflections of the symbols transmitted by the first transmitter 110, which reflect back from the distal end of the channel. Echo interference manifests itself at the receiver in a delayed fashion with respect to the symbol transmissions by the first transmitter 110, since the symbols first propagate along the entire length of the channel, then reflect back the entire length of the channel in the reverse direction. With the channel propagation delay time represented as Td, the echo thus appears at the first receiver 114 a time amounting to 2Td following the symbol transmissions. Represented as a small blip with a transition, at 128, the interference may cause sampling errors by the first receiver 114 if the interference arises towards a center of a valid data region of the received symbol, such as at 130, which is between two edge transitions of the symbol, at 132 and 134. Interference that transitions during an edge transition of a given symbol, such as at 132 and 134 is far less problematic.

Figure 2:
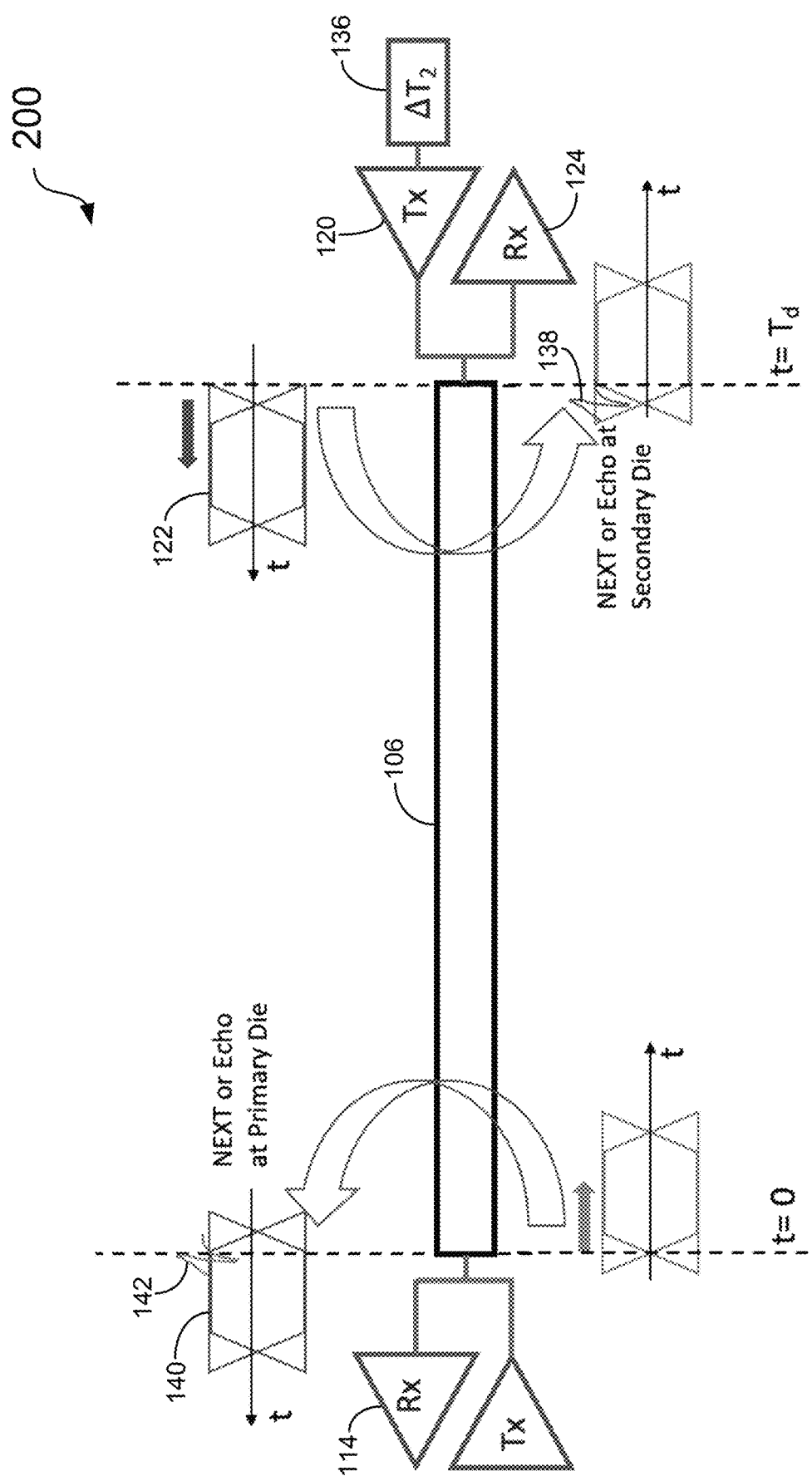
FIG. 2 illustrates the chip-to-chip coupling of FIG. 1 and including one embodiment of adjustment circuitry that provides crosstalk compensation.

In an effort to shift expected interference towards a received symbol edge transition, one embodiment of a die-to-die connection scheme, shown in FIG. 2, provides for a controlled delay adjustment of an electrical delay of the bidirectional wireline link 106. For one specific embodiment, this involves applying a timing offset AT2 at the second transmitter 120, with a delay circuit 136. The timing offset AT2 serves to shift the phase of the transmitted second data 122 by the amount of the offset AT2, and correspondingly shifts the phase of the NEXT and echo interference, shown at 138, that arises at the second receiver 124. For one embodiment, the size of the timing offset AT2 corresponds to an uncompensated phase difference between the received data symbol transition and the local transmit symbol transition. Application of the timing offset AT2 thus aligns the transitions. Since the second data symbols 122 are transmitted with the applied offset AT2, the first receiver 114 receives the symbols with the applied offset, such as at 140. While the timing for transmission and receipt of the first data symbols remains unaffected, the NEXT and echo interference caused by the first data symbol transmissions, shown at 142, shifts towards the second data symbol transition by an amount corresponding to the timing offset AT2. Although the position of the interference transition is closer to the edge transition of the received second data symbol, it is still somewhat problematic for that side of the channel. Thus, even though application of the relative timing offset AT2 compensates for the NEXT and echo interference at one end of the channel, the other end may still be affected.

Figure 3:
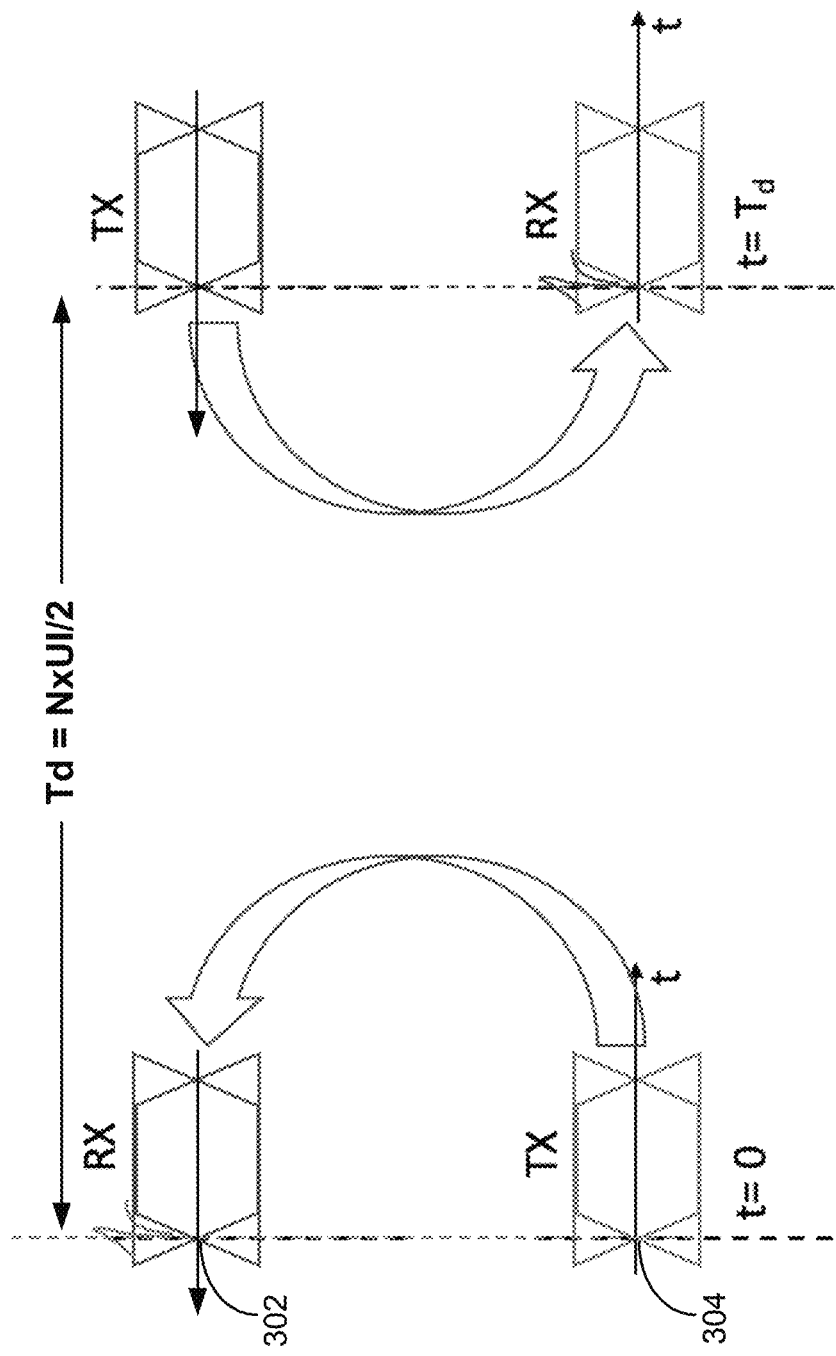
FIG. 3 illustrates a further embodiment of the adjustment circuitry of FIG. 2 that addresses applications involving an optimal channel length.

FIG. 3 illustrates a die-to-die connection scheme where the delay adjustment of an electrical delay of the bidirectional channel is carried out by establishing an optimum channel length in terms of the symbol time. This involves tuning the channel propagation delay Td to move the received signal transitions, such as at 302, on the primary side to align with the primary transmit transitions, such as at 304. For one embodiment, the tuning may be accomplished consistent with the relationship Td=N*UI/2, where UI represents the unit interval of each symbol and N is the number of symbols. The delay adjustment thus may be viewed as a relative adjustment of an electrical delay of the bidirectional channel relative to the symbol time of the first data.

Adjusting channel lengths may be practical at very high speeds (such as when the UI is a very small length increment of the overall channel), and where a user has control over the channel (such as in a die-to-die situation). In some applications, however, the channel length may not be adjustable, resulting in the channel length being a non-optimal length that doesn't satisfy the desired transition alignment constraints to achieve NEXT and echo interference reduction.

Figure 4:
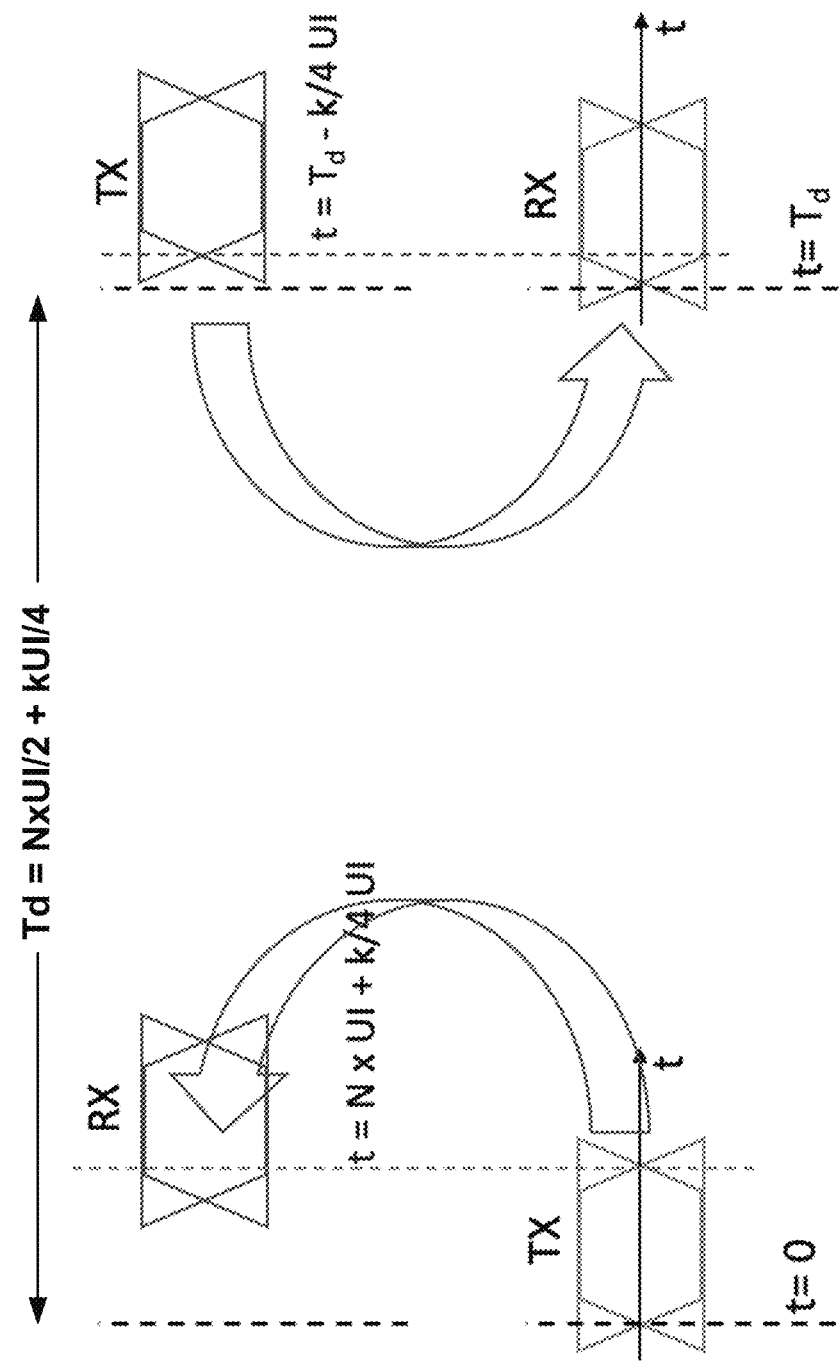
FIG. 4 illustrates an additional embodiment of the adjustment circuitry of FIG. 2 that addresses situations involving a non-optimal channel length.

FIG. 4 illustrates a die-to-die connection scheme that may be employed when the channel length has limited or no adjustability and is of a non-optimal electrical length. Assuming that the channel delay Td can be defined by the relationship (N+k/2)*UI/2, and employing the tunable delay or offset of the embodiment of FIG. 2, an optimal offset for the secondary side of the channel is $-k/2*UI$, where k is between $-1$ and 1. However, use of this offset may create a non-optimal case at the primary side of the channel. For one embodiment, the size of the non-optimality may be distributed between the two sides of the channel, thereby reducing the impact of the NEXT and echo interference evenly, and away from the center of the received symbol where the receive sampling occurs. The magnitude of the tunable delay or offset thus becomes $k/4*UI$. With this offset applied at one end of the wireline link 106, and manifesting itself at both ends of the wireline link 106, the timing difference between the secondary received signal transitions and its local transmit transitions will be $-k/4*UI$, instead of ideally zero, and the timing difference between the primary received signal transitions and its local transmit transitions will be $+k/4*UI$. For some embodiments, the distributed delay at each side of the link may not necessarily be equal. In practice, the tunable delay may be adjusted in a live link to find the best combined performance for both sides.

Figure 5:
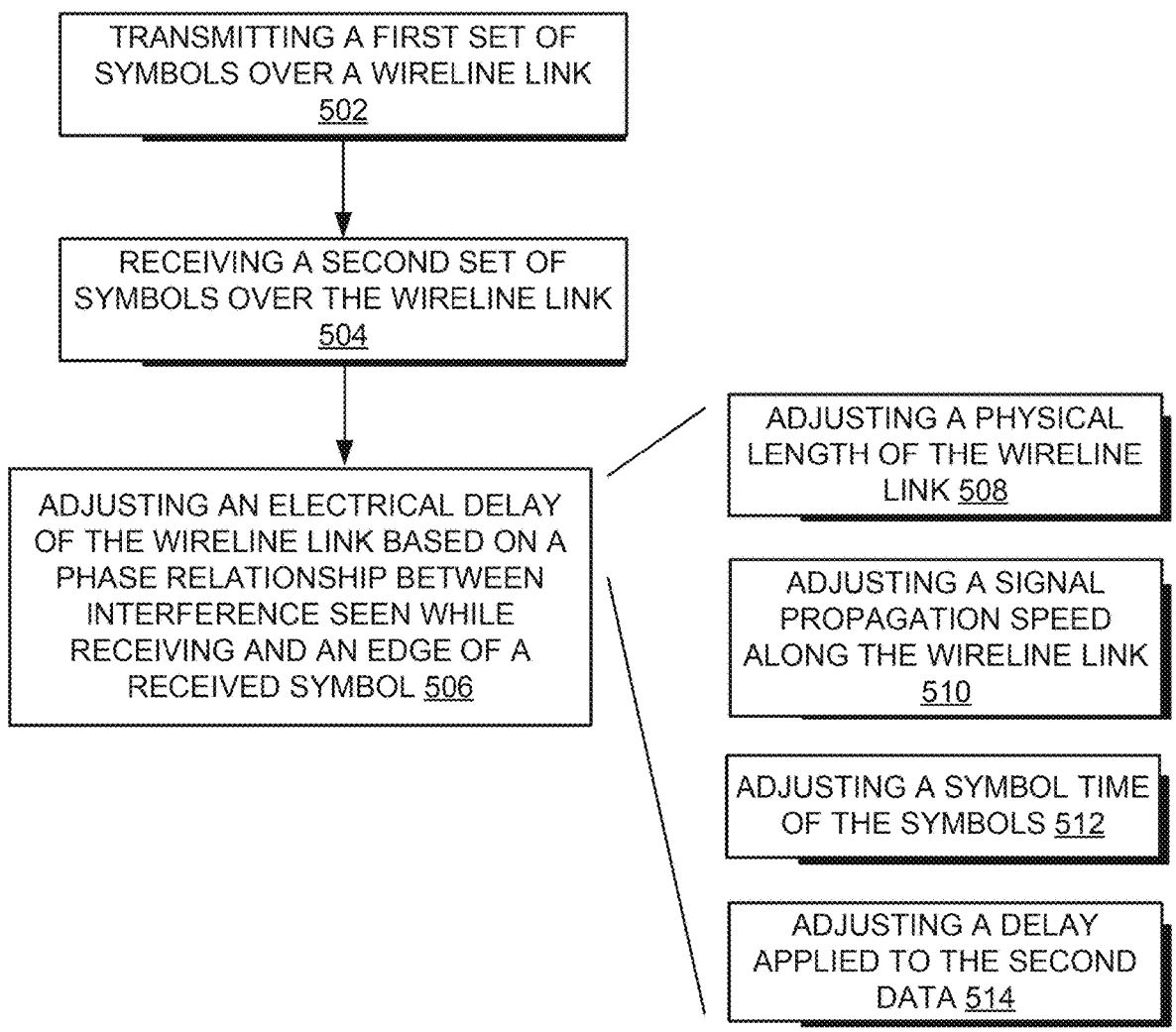
FIG. 5 illustrates a flowchart of steps for one embodiment of a method of crosstalk compensation.

FIG. 5 illustrates method steps consistent with the above-described techniques to reduce the effects of crosstalk on a wireline link using a controlled channel delay. At 502, a first set of symbols are transmitted from one end of the bidirectional link by a first transmitter. A first receiver receives a second set of symbols at the same end of the bidirectional wireline link, at 504. At 506, an electrical delay of the bidirectional wireline link is adjusted, with the adjustment being based on a phase relationship between interference seen at the first receiver and an edge of a symbol of the second set of symbols received at the first receiver. At 508, the adjustment may involve adjusting a physical length of the bidirectional wireline link. Alternatively, or in combination with adjusting the physical length, the adjustment involves adjusting a signal propagation speed of the symbols along the bidirectional wireline link, at 510. At 512, the adjusting may also or solely involve adjusting a symbol time, or data rate, of the symbols propagating over the bidirectional wireline link, or a secondary delay added to the second receiver circuitry. At 514, the adjusting may alternatively (or in combination with any of the above) involve delaying transmission of the second data from the other end of the bidirectional wireline link.

The embodiments described above provide effective low-power solutions to address cancelling crosstalk between high-speed parallel links in die-to-die interfaces. Each embodiment may be employed independently on its own, or in combination with any of the other embodiments described above. The use of passive circuitry to provide the crosstalk cancellation not only enables use of low-cost circuit elements to keep costs low, but also reduces power consumption by avoiding, where practicable, active circuitry to cancel crosstalk.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present disclosure. In some instances, the terminology and symbols may imply specific details that are not required to practice aspects of the disclosure. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While aspects of the disclosure have been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A wireline signaling link, comprising:
    a first transceiver circuit disposed on a first integrated circuit (IC) chip, the first transceiver circuit comprising
        first transmit circuitry to transmit a first set of symbols representing first data, each symbol comprising a symbol time;
        first receiver circuitry to receive a second set of symbols representing second data;
    a second transceiver circuit disposed on a second IC chip;
    a bidirectional channel comprising a first end coupled to the first transceiver circuit and a second end coupled to the second transceiver circuit; and
    circuitry to make an adjustment of an electrical delay of the wireline signaling link, the adjustment based on a phase relationship between interference associated with the first data that is received by the first receiver circuitry and the second data that is received by the first receiver circuitry.

2. The wireline signaling link of claim 1, wherein:
    the circuitry is to make the adjustment based on a difference in phase between a first transition of the interference and a second transition of the second data as-received by the first receiver circuitry at a sampling instant of the second data.

3. The wireline signaling link of claim 2, wherein:
    the circuitry is to adjust the difference in phase between the first transition of the interference and the second transition of the second data towards zero.

4. The wireline signaling link of claim 2, wherein:
    the circuitry is to adjust the difference in phase between the first transition of the interference and the second transition of the second data towards a value other than zero and represented by k/4*UI, where k is a value between −1 and +1, and UI represents a symbol time interval.

5. The wireline signaling link of claim 2, wherein:
    the second transceiver circuit comprises
        second transmit circuitry to transmit the second data;
        second receiver circuitry to receive the first data; and
    wherein the adjustment is further based on a second phase relationship between interference associated with the second data that is received by the second receiver circuitry and the first data that is received by the second receiver circuitry.

6. The wireline signaling link of claim 1, wherein the circuitry comprises at least one of
    circuitry to delay transmission of the second data along the bidirectional channel,
    circuitry to adjust a signal propagation speed over the bidirectional channel, and
    circuitry to adjust the symbol time.

7. The wireline signaling link of claim 1, wherein the interference comprises:
at least one of echo interference comprising reflections from the second end of the bidirectional channel, the reflections being associated with transmission of the first set of symbols by the first transmit circuitry and near-end crosstalk (NEXT) associated with transmission of the first set of symbols by the first transmit circuitry.

8. An integrated circuit (IC) chip, comprising:
transmit circuitry to couple to one end of a bidirectional wireline channel, the transmit circuitry to transmit a first set of symbols representing first data, each symbol comprising a symbol time;
receiver circuitry to couple to the one end of the bidirectional wireline channel, the receiver circuitry to receive a second set of symbols representing second data; and
circuitry to make an adjustment to a difference in phase between a first transition of interference associated with the first data that is received by the receiver circuitry and a second transition of the second data that is received by the receiver circuitry at a sampling instant of the second data.

9. The IC chip of claim 8, wherein:
the circuitry is to adjust the difference in phase between the first transition of the interference and the second transition of the second data towards zero.

10. The IC chip of claim 8, wherein:
the circuitry is to adjust the difference in phase between the first transition of the interference and the second transition of the second data towards a value other than zero and represented by k/4*UI, where k is a value between −1 and +1, and UI represents a symbol time interval.

11. The IC chip of claim 8, wherein the circuitry comprises at least one of
circuitry to adjust a signal propagation speed over the bidirectional wireline channel, and
circuitry to adjust the symbol time.

12. The IC chip of claim 8, wherein the interference comprises:
at least one of echo interference comprising reflections from a second end of the bidirectional wireline channel, the reflections being associated with transmission of the first set of symbols by the transmit circuitry, and near-end crosstalk (NEXT) associated with transmission of the first set of symbols by the transmit circuitry.

13. A multi-chip module (MCM), comprising:
a first integrated circuit (IC) chip comprising a first transceiver comprising
first transmit circuitry to transmit a first set of symbols representing first data, each symbol comprising a symbol time;
first receiver circuitry to receive a second set of symbols representing second data;
a second IC chip comprising a second transceiver comprising
second transmit circuitry to transmit the second data;
second receiver circuitry to receive the first data;
a bidirectional channel comprising a first end coupled to the first transceiver and a second end coupled to the second transceiver to form a link; and
circuitry to make an adjustment of an electrical delay of the link, the adjustment based on at least one of (1) a first phase relationship between interference associated with the first data that is received by the first receiver circuitry and the second data that is received by the first receiver circuitry and (2) a second phase relationship between second interference associated with the second data that is received by the second receiver circuitry and the first data that is received by the second receiver circuitry.

14. The MCM of claim 13, wherein:
for the first phase relationship, the circuitry is to make the adjustment based on a difference in phase between a first transition of the interference and a second transition of the second data as-received by the first receiver circuitry at a sampling instant of the second data; and
for the second phase relationship, the circuitry is to make the adjustment based on a difference in phase between a third transition of the second interference and a fourth transition of the first data as-received by the second receiver circuitry at a sampling instant of the first data.

15. The MCM of claim 14, wherein:
for the first phase relationship, the circuitry is to adjust the difference in phase between the first transition of the interference and the second transition of the second data towards zero; and
for the second phase relationship, the circuitry is to adjust the difference in phase between the third transition of the second interference and the fourth transition of the first data towards zero.

16. The MCM of claim 14, wherein:
for the first phase relationship, the circuitry is to adjust the difference in phase between the first transition of the interference and the second transition of the second data towards a first value other than zero and represented by k/4*UI, where k is a value between −1 and +1, and UI represents a symbol time interval; and
for the second phase relationship, the circuitry is to adjust the difference in phase between the third transition of the second interference and the fourth transition of the first data towards a second value having a same magnitude as the first value and opposite in phase to the first value.

17. The MCM of claim 13, wherein the circuitry comprises at least one of
circuitry to delay transmission of the second data along the bidirectional channel,
circuitry to adjust a signal propagation speed over the bidirectional channel, and
circuitry to adjust the symbol time.

18. The MCM of claim 13, wherein the interference comprises:
echo interference comprising reflections from the second end of the bidirectional channel, the reflections being associated with transmission of the first set of symbols by the first transmit circuitry.

19. The MCM of claim 13, wherein the interference comprises:
near-end crosstalk (NEXT) associated with transmission of the first set of symbols by the first transmit circuitry.

* * * * *